United States Patent

Hammer

[11] Patent Number: 5,322,334
[45] Date of Patent: Jun. 21, 1994

[54] DEVICE FOR POSITIVELY TELESCOPICALLY EXTENDING AND RETRACTING

[76] Inventor: Mordechai Hammer, 51A Harav Friedman St., 62303 Tel Aviv, Israel

[21] Appl. No.: 923,657

[22] Filed: Aug. 3, 1992

Related U.S. Application Data

[63] Continuation-in-part of Ser. No. 912,415, Jul. 13, 1992.

[30] Foreign Application Priority Data

Jul. 24, 1991 [IL] Israel ........................................ 98944

[51] Int. Cl.$^5$ .............................................. B25J 1/02
[52] U.S. Cl. .................................. 294/19.1; 15/144.4; 16/115
[58] Field of Search ............ 294/1.4, 1.5, 19.1, 294/22, 23, 57; 15/144.3, 144.4; 16/115; 52/118, 121; 56/332-340; 74/89.2, 89.22, 110, 501.6; 81/53.1-53.12, 177.2; 182/40, 63, 66, 207, 208, 213; 187/9 E; 212/184, 187, 199, 230, 264, 267, 269; 248/157, 161, 333, 404; 403/109; 414/718

[56] References Cited

U.S. PATENT DOCUMENTS

| | | | |
|---|---|---|---|
| 336,414 | 2/1886 | Kerr | 182/63 X |
| 892,980 | 7/1908 | Cooper | 182/208 |
| 926,642 | 6/1909 | Concoff et al. | 182/208 |
| 1,611,326 | 12/1926 | Abbe | 212/267 |
| 3,836,011 | 9/1974 | Sakamoto et al. | 212/269 X |
| 4,169,338 | 10/1979 | Eik | 212/267 X |

*Primary Examiner*—Johnny D. Cherry
*Attorney, Agent, or Firm*—Mark M. Friedman

[57] ABSTRACT

An extendible-retractable device, which is made up of a number of interconnected members and to which a suitable tool may be attached. The device makes it possible to continually change the position of the tool as a task is being performed. The device includes members which are attached to each other through flexible cables so that relatively small movements of a handle or similar device in the hand of the user results is relatively large extension or retraction movements of the farthest member which carries the tool.

1 Claim, 2 Drawing Sheets

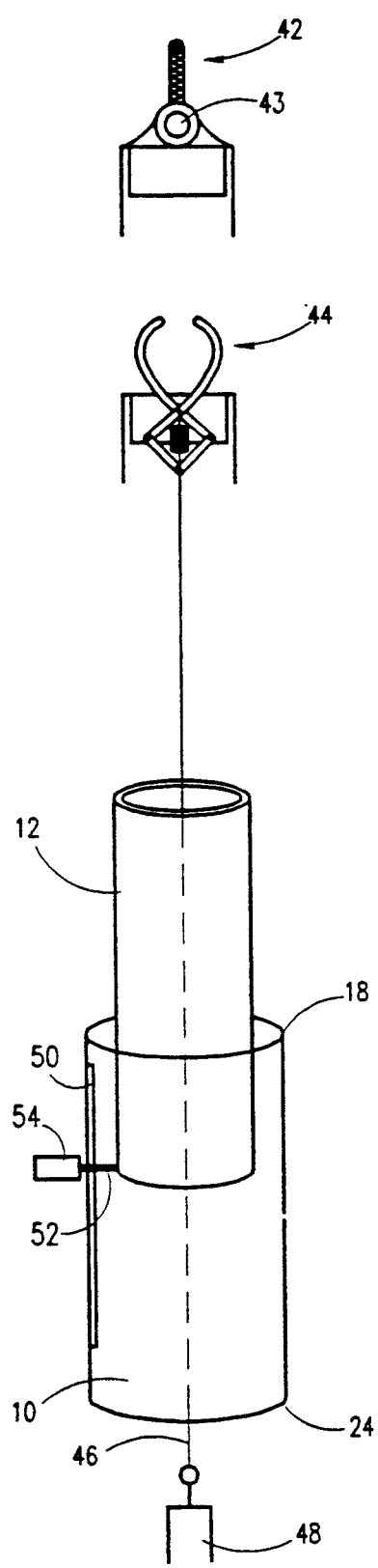
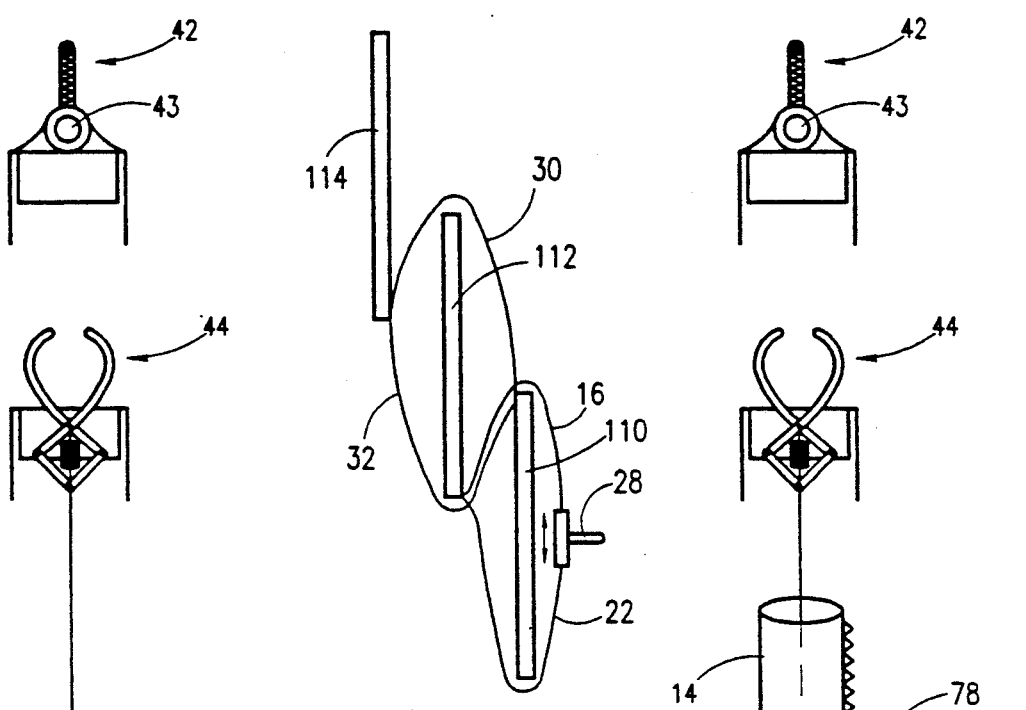
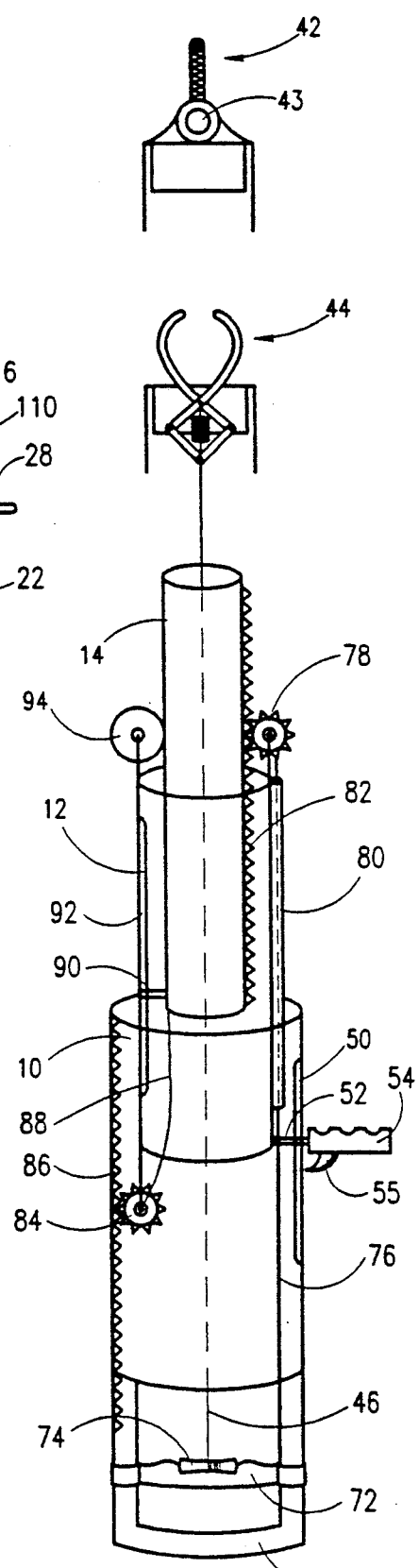

DEVICE FOR POSITIVELY TELESCOPICALLY EXTENDING AND RETRACTING

This is a continuation-in-part of U.S. patent application Ser. No. 912,415, filed Jul. 13, 1992.

FIELD AND BACKGROUND OF THE INVENTION

The present invention relates to a device which is useful for efficiently extending and retracting a wide variety of tools and, more particularly, to a device made up of a plurality of interacting members which can be easily extended and retracted so as to place in the desired location a tool or other instrumentality attached to the device.

It is often desirable to be able to place and cause to operate a tool or other instrumentality (hereinafter "tool") at a location which is more distant than can be comfortably reached by extending one's arm with the tool therein. For example, when one wishes to change an incandescent light bulb located in a ceiling which is ten feet tall, it is necessary to grab and rotate the light bulb. To this end one might climb on a ladder and use one's hand to replace the bulb. Alternatively, one could obviate the need to use a ladder by using a sufficiently long pole which had a tool at its end which was capable of grabbing and rotating the bulb. In this case, the operator would remain standing safely on the ground while replacing the light bulb and would carry out the operation through the use of the long pole.

While a pole as described is useful in certain applications, it is not free from shortcomings. Primarily, it is known that, unlike the case of replacing a light bulb described above, in many operations the location at which the operation is to take place is not at a fixed distance from the user but varies either discretely or continually during the operation.

For example, if one wished to paint the ten-foot tall walls and the ceiling of a room with a paint roller, means must be at hand for locating the roller at every point on the walls and ceiling. Furthermore, the location of the roller varies instantaneously during each painting stroke, regardless of the position of the painter. One option is to use a hand-held roller and make use of a ladder or scaffolding to reach the top portions of the walls and the ceiling. Another alternative is to mount the roller on a sufficiently long pole which will allow the top portions of the walls and the ceiling to be reached with the painter remaining standing on the floor without requiring the use of a ladder.

One disadvantage of this technique is that the length of a stroke is limited by the distance through which the painter's arms can move, i.e., if the painter is able to translate the pole a distance of three feet, the paint stroke on the wall will be limited to three feet.

A further disadvantage of this technique is that the pole is of fixed length and may therefore be of limited use in other applications. Thus, a five foot pole which may be useful in painting a room having ten-foot high walls and ceiling, may be largely inadequate in painting a room having fifteen-foot high walls and ceiling.

To partially overcome the latter disadvantage and to thereby increase its versatility, it is possible to form the pole from a number of detachable modules. In this way modules could be added or removed before each use so as to produce a pole with overall length which is adequate for the intended task. While the modularization of the pole overcomes certain difficulties, it remains a tedious chore to add or remove modules before each task. More importantly, once a pole of proper length has been assembled, it continues to suffer from the disadvantage described above relating to the limitation on the length of the stroke.

A possible solution is to form a pole made up of a number of interconnected members which are able to move relative to one another and thereby alternately lengthen and shorten the pole. Such a pole may use hydraulic or pneumatic means, not unlike those used in a variety of winches, for example, the system used to position a basket carrying an electrical repairman sufficiently near a transformer as to allow the repairman to work on the transformer. However, such systems are heavy and mechanically complicated and are thus not suitable for a simple hand-held pole for use in properly locating a relatively light tool.

There is thus a widely recognized need for, and it would be highly advantageous to have, an extendible-retractable device which can be actively and positively extended and retracted, as desired by the user, with the device oriented at any angle, to which a tool could be attached and which could be easily used to rapidly vary the length of the pole during the performance of a particular task.

SUMMARY OF THE INVENTION

According to the present invention there is provided an extendible-retractable device, comprising: (a) a first member; (b) a second member movable relative to the first member; (c) a first flexible connector attached to a posterior portion of the second member, the first flexible connector being constrained by and being movable relative to a first location of the first member; and (d) a second flexible connector attached to a posterior portion of the second member, the second flexible connector being constrained by and being movable relative to a second location of the first member, the second location being posterior of the first location, the first flexible connector and the second flexible connector being coupled to each other so that the first flexible connector, the second flexible connector and the second member all move simultaneously.

According to further features in preferred embodiments of the invention described below, there is further provided: (e) a third member movable relative to the first member and the second member; (f) a third flexible connector attached to a posterior portion of the third member, the third flexible connector being constrained by and being movable relative to a first location of the second member, the third flexible connector being attached to a first attachment location of the first member so that anteriorly-directed motion of the second member results in anteriorly-directed motion of the third member; and (g) a fourth flexible connector attached to a posterior portion of the third member, the fourth flexible connector being constrained by and being movable relative to a second location of the second member, the second location being posterior of the first location, the fourth flexible connector being attached to a second attachment location of the first member so that posteriorly-directed motion of the second member results in posteriorly-directed motion of the third member.

According to still further features in the described preferred embodiments the members are nested together and are approximately cylindrical in shape, although the members may not be nested but rather may be arranged next to each other.

According to still further features in the described preferred embodiments, attached to the farthest member is a suitable tool which may be, among many other possibilities, a paint brush, a paint roller, a mop, a dust brush, a cutting tool, a tongs, or a fitting capable of attaching the device to another body.

According to another embodiment according to the present invention there is provided an extendible-retractable device, comprising: (a) a first member formed with a longitudinal slot; (b) a second member movable relative to the first member; (c) a rigid connector attached to a posterior portion of the second member, the rigid connector being slidable through the longitudinal slot of the first member so that the second member is moved whenever the rigid connector is moved; (d) a third member movable relative to the first member and the second member; (e) a third flexible connector attached to a posterior portion of the third member, the third flexible connector being constrained by and being movable relative to a first location of the second member, the third flexible connector being attached to a first attachment location of the first member so that anteriorly-directed motion of the second member results in anteriorly-directed motion of the third member; and (f) a fourth flexible connector attached to a posterior portion of the third member, the fourth flexible connector being constrained by and being movable relative to a second location of the second member, the second location being posterior of the first location, the fourth flexible connector being attached to a second attachment location of the first member so that posteriorly-directed motion of the second member results in posteriorly-directed motion of the third member.

According to yet another embodiment according to the present invention there is provided an extendible-retractable device, comprising: (a) a first member formed with a longitudinal slot and having a second rack; (b) a second member movable relative to the first member and having a first pinion near its anterior end and a second pinion near its posterior end, the second pinion engaged to the second rack; (c) a rigid connector attached to a posterior portion of the second member, the rigid connector being slidable through the longitudinal slot of the first member so that the second member is moved whenever the rigid connector is moved; (d) a third member movable relative to the first member and the second member, the third member having a first rack engaged to the first pinion, the pinion being rotatable by a cable which is attached to the first member so that anteriorly-directed motion of the second member results is anteriorly-directed motion of the third member, the third member being attached to a second pinion cable for rotating the second pinion, so that posteriorly-directed motion of the second member results is posteriorly-directed motion of the third member.

The present invention successfully addresses the shortcomings of the presently known configurations by providing an extendible-retractable device on which can be mounted a suitable tool which can be used to continually change the position of the tool so as to facilitate carrying out the task.

BRIEF DESCRIPTION OF THE DRAWINGS

The invention is herein described, by way of example only, with reference to the accompanying drawings, wherein:

FIG. 3 is yet another device made up of two members and featuring a rigid connector;

FIG. 4 is a device made up of three members which are arranged next to each other rather than inside one another as in FIG. 1;

FIG. 5 is still another embodiment of a device according to the present invention featuring three members, a rigid connector and rack-and-pinion mechanisms.

DESCRIPTION OF THE PREFERRED EMBODIMENTS

The present invention is of a device which can be used to continually change the position of a tool during the operation of the tool. Specifically, the present invention can be used to conveniently and rapidly carry out a large variety of tasks which would otherwise require careful preparation and/or the use of ladders and similar devices. For example, a device according to the present invention can be used to quickly and safely paint entire walls and ceilings while standing on the floor. It can be used to replace light bulbs in the ceiling without having to climb on a ladder or touch the bulb. It can be used to take down a book or a grocery store item located on a high shelf without use of a chair or a ladder.

The principles and operation of an extendible-retractable device according to the present invention may be better understood with reference to the drawings and the accompanying description.

Figure 1:
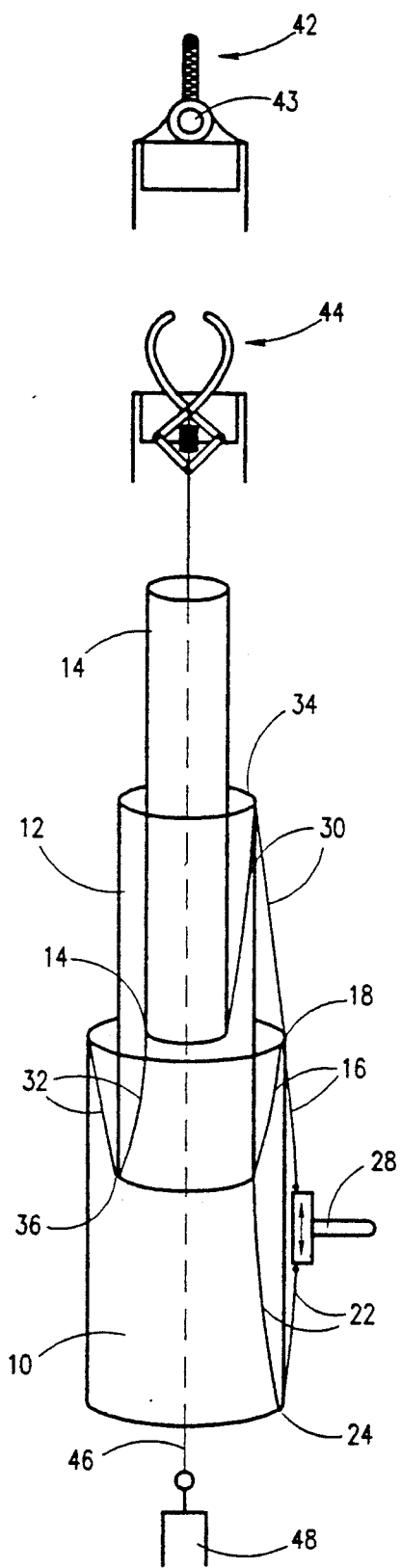
FIG. 1 is a device made up of three members.
Figure 2:
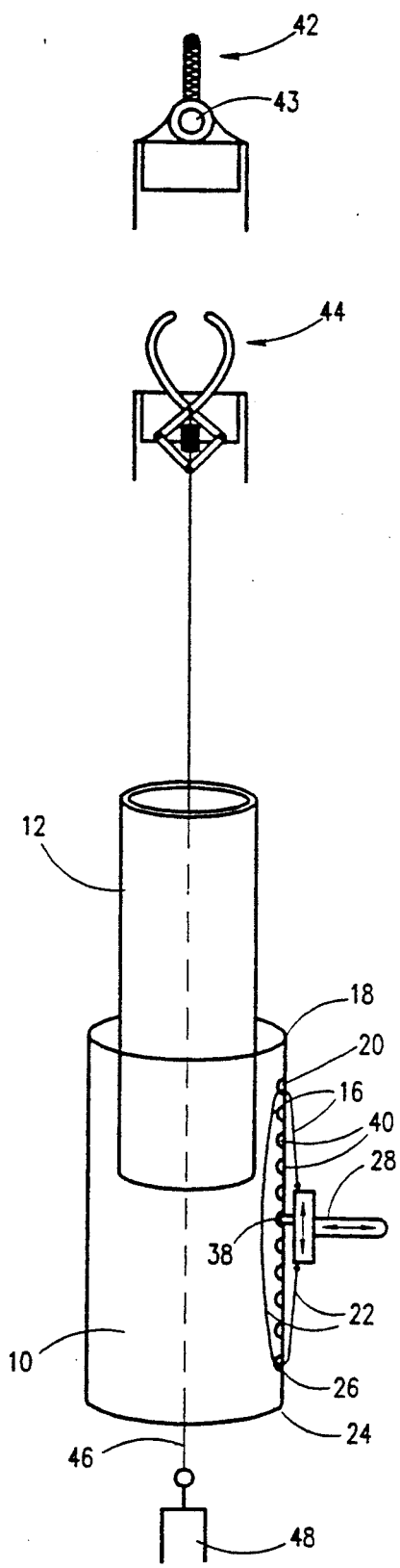
FIG. 2 is another device made up of two members and featuring a detachable handle.

Referring now to the drawing, FIGS. 1 and 2 illustrate two related embodiments of the present invention. The device illustrated includes three members—a first member 10, a second member 12 and a third member 14. The three members are sized and shaped so as that third member 14 fits inside second member 12 which, in turn, fits inside first member 10. Second member 12 and third member 14 are movable parallel to each other and relative to first member 10. The members shown are cylindrical in shape, but any other suitable shape may be used. For example, a system according to the present invention may include a member of square cross section nested within a member of circular cross section. This facilitates the prevention of rotation of one member relative to another. In certain applications, however, it may be desirable to have one member rotate relative to another, either automatically as part of the extension or retraction process (e.g. with the aid of a spiral protrusion on the outside surface of an inner member) or independently controlled by the user. It is not essential that the three members be nested inside each other as will be discussed below in the context of FIG. 4.

A first flexible connector 16, which is preferably a suitable cable, is attached to second member 12, preferably at its posterior portion, most preferably at its posterior edge. The attachment is preferably permanent. First flexible connector 16 then runs from its point of attachment to second member 12 to the adjoining anterior edge 18 of first member 10. It is preferable to include a small pulley wheel (not shown) permanently attached to first member 10 at anterior edge 18 to facilitate movement of first flexible connector 16 and prevent friction and wear of first flexible connector 16. From there, first flexible connector 16 runs posteriorly along the wall of first member 10. Rather than passing over the anterior edge 18 of first member 10, first flexible connector 16 may be made to pass through a first hole 20 (FIG. 2), preferably located near the anterior edge 18 of first member 10, which may, itself include a friction-reducing pulley. In either case, first flexible connector 16 is made to pass through a fixed point on first member 10, preferably located at or near anterior edge 18 of first member 10.

A second flexible connector 22, which is preferably a suitable cable, is also attached to second member 12, preferably at its posterior portion, most preferably at its posterior edge. The attachment is..preferably permanent. Second flexible connector 22 then runs from its point of attachment to second member 12 to the adjoining posterior edge 24 of first member 10. It is preferable to include a small pulley wheel (not shown) permanently attached to first member 10 at posterior edge 24 to facilitate movement of second flexible connector 22 and prevent friction and wear of second flexible connector 22. From there, second flexible connector 22 runs anteriorly along the wall of first member 10. Rather than passing under the posterior edge 24 of first member 10, second flexible connector 24 may be made to pass through a second hole 26 (FIG. 2), which is posterior of first hole 20 and which is preferably located near the posterior edge 24 of first member 10, which may, itself include a friction-reducing pulley. In either case, second flexible connector 24 is made to pass through a fixed point on first member 10, preferably located at or near posterior edge 24 of first member 10.

The end of first flexible connector 16 and the end of second flexible connector 22 which are not connected to second member 12 are coupled to each other either directly or indirectly. When coupled directly to each other the two flexible connectors form, in effect, a single flexible connector. Operation of the device in this case is by alternatively pulling the joined flexible connector anteriorly and posteriorly. Rather than joining the ends of the two flexible connectors, it is clear that it is possible to use a single flexible connector from the start and thereby obviate the need to attach to each other two connectors. Similarly, it is clear that two flexible connectors attached to second member 12 may alternatively be a single connector which is attached to second member 12.

Alternatively, the two ends of flexible connectors 16 and 22 are each attached to opposite ends of a handle 28. Alternatively, a handle 28 may be mounted onto and fixedly connected to a single flexible connector. Flexible connectors 16 and 22 are sufficiently taut that longitudinal motion of handle 28 translates into longitudinal motion in the opposite direction of second member 12. To facilitate use of the device it may be desirable to include a secondary handle (not shown) fixedly connected to first member 10. This secondary handle, which may extend posteriorly from first member 10, or which may form the posterior portion of first member 10, would be intended as a place for the user's other hand, i.e., the hand not used to operate handle 28, to firmly grasp the device and help create the relative-motion between handle 28 and first member 10.

Handle 28 may be of any suitable design. In the embodiment of FIG. 1, handle 28 hangs on the side of first member 10. In a preferred embodiment, handle 28 is equipped with means for attaching handle 28 to first member 10. Such means may take the form of a protrusion 38 in the surface of handle 28 facing first member 10. Protrusion 38 is sized and shaped so as to fit within one or a series of depressions 40 in the side of first member 10. This mechanism makes it possible to fix the position of handle 28 once the desired extension or retraction has been achieved, and prevents the extent of the extension or retraction from accidentally changing.

In an alternative embodiment according to the present invention, handle 28 is replaced by a winch mechanism (not shown) which is permanently attached to first member 10. Rather than pulling handle 28 anteriorly or posteriorly, the winch is turned to accomplish the same goal. The winch may further include means, such as a ratchet mechanism, for locking the winch in a particular position so as to prevent the members from moving relative to each other.

In the preferred embodiment of FIG. 1, third member 14 is connected to first member 10 through a third flexible connector 30 and a fourth flexible connector 32.

Third flexible connector 30, which is preferably a suitable cable, is attached to third member 14, preferably at its posterior portion, most preferably at its posterior edge. The attachment is preferably permanent. Third flexible connector 30 then runs from its point of attachment to third member 14 to the adjoining anterior edge 34 of second member 12. It is preferable to include a small pulley wheel (not shown) permanently attached to second member 12 at anterior edge 34 to facilitate movement of third flexible connector 30 and prevent friction and wear of third flexible connector 30. From there, third flexible connector 30 runs posteriorly along the wall of second member 12. Rather than passing over the anterior edge 34 of second member 12, third flexible connector 30 may be made to pass through a third hole (not shown), preferably located near the anterior edge 34 of second member 12. In either case, third flexible connector 30 is made to pass through a fixed point on second member preferably located at or near anterior edge 34 of second member 12. The end of third flexible connector 30 is attached to a fixed point, preferably at or near the anterior edge of first member 10, and preferably permanently, in such a way that third flexible connector is always taut so that anteriorly-directed motion of second member 12 results in anteriorly-directed motion of third member 14.

A fourth flexible connector 32, which is preferably a suitable cable, is also attached to third member 14, preferably at its posterior portion, most preferably at its posterior edge. The attachment is preferably permanent. Fourth flexible connector 32 then runs from its point of attachment to third member 14 to the adjoining posterior edge 36 of second member 12. It is preferable to include a small pulley wheel (not shown) permanently attached to second member 12 at posterior edge 36 to facilitate movement of fourth flexible connector 32 and prevent friction and wear of fourth flexible connector 32. From there, fourth flexible connector 32 runs anteriorly along the wall of second member 12. Rather than passing under the posterior edge 36 of second member 12, fourth flexible connector 32 may be made to pass through a fourth hole (not shown), which is posterior of the third hole described above and which is preferably located near the posterior edge 36 of second member 12. The end of fourth flexible connector 32 is attached to a fixed point, preferably at or near the anterior edge of first member 10, and preferably permanently, in such a way that fourth flexible connector 32 is always taut so that anteriorly-directed motion of second member 12 results in anteriorly-directed motion of third member 14. Preferably, third flexible connector 30 and fourth flexible connector 32 are connected to third member 14 at opposing points along its circumference. Similarly, third flexible connector 30 and fourth flexible connector 32 are preferably connected to first member 10 at opposing points along its circumference. Such placement of the attachment points serves to centralize third member 14 and reduce its tendency to engage the walls of second member 12 and produce undesirable frictional forces which tend to impede relative motion of the members. The centralization thus serves to facilitate the extension and retraction of the device. Toward the same ends, it may be preferable to include a number of connected or independent third flexible connectors 30 and/or a number of connected or independent fourth flexible connectors 32 disposed around the periphery of third member 14 to further centralize third member 14. Along the same lines, it may be preferably to utilize a number of connected or independent first flexible connectors 16 and/or a number of connected or independent second flexible connectors 22 disposed around the periphery of first member 10 to further stabilize and centralize second member 12.

A device according to the present invention may be used to carry a tool and place it where the user desires as the task being performed progresses. The variety of tools which can be used in conjunction with an extendible-retractable device according to the present invention is almost limitless. For convenience, they can be classified into passive tools, automatically activated tools, and independently activated tools. In each case, the tool is preferably connected, most preferably detachably, to the furthest member of the device.

Passive tools include those tools which need merely be connected to the furthest member. In this category fall tools such as a paint brush, a paint roller, a mop, a dust brush, and a stationary cutting tool, such as a knife. Also included in this category are various fittings which make it possible to connect the device to another body. For example, the tool could be used as a tripod to support a camera, or as a support for an antenna, or as a bolt onto which a shading member can be screwed to form a beach umbrella. Similarly, the fitting 42 may be such as to make possible the attachment of a second extendible-retractable device, as through an engageable opening 43, which would make it possible to quickly build rigid structures such as a tent.

Automatically activated tools are those which would be activated and deactivated by the very extension or retraction of the extendible-retractable device. For example, in picking fruits which are all at approximately the same height from the ground, it may be desirable to use a clipper which closes and cuts whenever the extendible-retractable device is extended.

Finally, independently activated tools are those which can be activated or operated by the user independently of the current extension or retraction status of the device. Examples might be various cutting tools, shears, scissors, and tongs 44 used to pick up and release various objects. To operate such tools, means would be provided to transmit an independent action by the user to the tool. One such means might be a coaxial cable configuration, such as is used in braking systems for bicycles. Sufficient coaxial cable 46 would be wound on a roller so that the cable could be automatically lengthened and shortened as the device is lengthened and shortened. The coaxial construction of the cable, with the inner cable being able to move relative to the outside tube, would allow the user to operate the tool regardless of the precise extension or retraction status of the device. To operate the tool, the user would move an operating handle 48.

Handle 48 may be of any suitable construction. One example of a different handle is shown in FIG. 5 wherein handle frame 70 is rigidly mounted to first member 10. Handle bar 72 is slidably mounted onto handle frame 70 so that the user can pull handle bar 72 toward handle frame 70 whenever it is desired to activate, for example, tongs 44. Preferably, handle bar 72 is biased, as by a spring (not shown) to a position away from handle frame 70. Onto handle bar 72 is mounted a spool 74 onto which is wound an appropriate length of cable 46 to accommodate the varying lengths of the device in various states of extension and retraction.

Another alternative configuration is shown in FIG. 3. Here first member 10 features a longitudinal slot A rigid connector 52 is attached to a posterior portion of second member 12. Rigid connector 52 is slidable through longitudinal slot 50 so that second member 12 is moved whenever rigid connector 52 is moved. Rigid connector 52 may be attached to or may include a handle element 54 which is found outside of first member 10. To extend or retract the device, the user would move handle element anteriorly or posteriorly, respectively. Such a mechanism replaces first flexible connector 16 and second flexible connector 22. The interconnections represented by third flexible connector 30 and fourth flexible connector 32 are as described above in the context of the previously discussed embodiments.

Yet another alternative embodiment of a device according to the present invention is shown in FIG. 4. The device is related to that shown in FIG. 1, except that rather than the three members being nested inside one another, the three members of FIG. 4, designated 110, 112, and 114, are arranged along side of each other.

Still another alternative configuration is shown in FIG. 5. Here, as in the embodiment shown in FIG. 3, first member 10 features a longitudinal slot 50. A rigid connector 52 is attached to a posterior portion of second member 12. Rigid connector 52 is slidable through longitudinal slot 50 so that second member 12 is moved whenever rigid connector 52 is moved. Rigid connector may be attached to or may include a handle element 54 which is found outside of first member 10. To extend or retract the device, the user moves handle element 54 anteriorly or posteriorly, respectively. Handle element 54 may include handle stopper 55 which can be inserted into longitudinal slot 50 whenever it is desired to immobilize handle element 54 so as to maintain a certain degree of extension or retraction of the device.

Attached to first member 10 is a first pinion cable 76 which is attached to a take-up spool (not shown) which is connected to, and is capable of rotating, a first pinion 78. First pinion 78 is mounted onto second member preferably near its anterior end. To reduce abrasion of first pinion cable 76, a tube 80 is preferably provided which is attached to second member 12 and through which first pinion cable 76 is able to move.

Mounted onto third member 14 opposite first pinion 78 is first rack 82 which engages first pinion 78. Whenever it is desired to extend the device, handle element 54 is pushed anteriorly, thereby forcing second element anteriorly. Since one end of first pinion cable 76 is fixed to first member 10, the anterior motion of second member 12 causes first pinion 78 to rotate clockwise. Since the gears of first pinion 78 are engaged with first rack 82, the rotation of first pinion 78 brings about the anterior displacement of third element 14.

To effect the retraction of the device, second member 12 is equipped with a second pinion 84, preferably at its posterior end, which engages second rack 86 mounted onto the interior surface of first member 10. A second pinion cable 88 is attached to second pinion 84 so as to be able to rotate it, and is attached at its other end to third member 14.

Whenever it is desired to retract the device, handle element 54 is pushed posteriorly, thereby forcing second element 12 posteriorly. The posterior motion of second member 12 causes second pinion 84 to rotate as it steps down along second rack 86. This rotation serves to take up second pinion cable 88 and thereby to displace third member 14 posteriorly.

Preferably, a device according to this embodiment further includes means for preventing the rotation of third member 14 relative to second member 12. This means may take the form of a pin 90 which is attached to third member 14 and which is capable of sliding only along anti-rotation slot 92. Second member 12 is prevented from rotating relative to first member 10 in similar fashion through the constraint offered by longitudinal slot 50 to the movement of rigid connector 52. Eliminating the rotation of the members relative to one another ensures that the rack-and-pinions are properly engaged at all times.

To help centralize third member 14, second member is preferably equipped with a centralizing wheel 94 which tends to keep third member 14 centralized and ensures proper engagement of first pinion 78 with first rack In each of the described embodiments it may be desirable to add one or more springs (not shown) which will tend to facilitate and expedite the extension (or the retraction) of the outlying members. When retracting (or extending) such a device, sufficient additional force would have to applied to overcome the opposing force of the springs.

While the invention has been described with respect to several embodiments, it will be appreciated that many variations, modifications and other applications of the invention may be made.

What is claimed is:

1. An extendible-retractable device, comprising:
   (a) a first member formed with a longitudinal slot and having a first member rack;
   (b) a second member having an anterior end an a posterior end, said second member being movable relative to said first member and having a first pinion near said anterior end and a second pinion near said posterior end, said second pinion engaged to said first member rack;
   (c) a rigid connected attached to a posterior portion of said second member, said rigid connector being slidable through said longitudinal slot of said first member so that said second member is moved whenever said rigid connector is moved;
   (d) a third member movable relative to said first member and said second member, said third member having a third member rack engaged to said first pinion, said first pinion being rotatable by a cable which is attached to said first member so that anteriorly-directed motion of said second member results in anteriorly-directed motion of said third member, said third member being attached to said second member pinion so that posteriorly-directed motion of said second member results is posteriorly-directed motion of said third member.

* * * * *